3,016,380
TETRAHYDROPYRANYL AND TETRAHYDRO-
FURYL DERIVATIVES OF THIAMINE
Shojiro Yurugi, Marutamachidori-Sembon-Higashiiru-Sagaru, Kamigyo-ku, Kyoto, and Tomiyoshi Fushimi, Toyonaka, Japan, assignors to Takeda Pharmaceutical Industries, Ltd., Osaka, Japan
No Drawing. Filed Aug. 15, 1958, Ser. No. 755,135
Claims priority, application Japan Aug. 16, 1957
6 Claims. (Cl. 260—256.5)

This invention relates to compounds having the general formula:

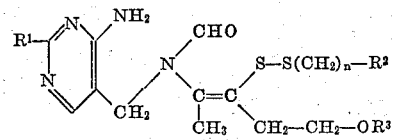

wherein $R^1$ is a methyl or ethyl radical, $R^2$ is a tetrahydrofuryl or tetrahydropyranyl radical, $R^3$ is hydrogen or an acyl radical, and $n$ is a positive integral number, and to a process for producing the same.

Though there have been known, in recent years, many kinds of thiamine derivatives having asymmetrical structures resembling the above formula, those derivatives have an alkyl, aryl, aralkyl radical or the like instead of the $-(CH_2)_n-R^2$. These compounds are superior to thiamine acid salts in medicinal effect, but they have generally unpleasant mercaptan-like odor.

The present inventors have sought to discover new and more excellent disulfide-type thiamine derivatives and succeeded in obtaining a new group of disulfide-type thiamine derivatives which have no longer the above shortcoming and the medicinal effect of which is superior to that of known derivatives, not to speak of thiamine acid salts.

Superiority of the compounds of this invention is evident from the results of the following tests, for example.

In the tests three kinds of thiamine derivatives belonging to the new group were used, i.e. thiamine tetrahydrofurfuryl disulfide, thiamine tetrahydrofuryl-2-propyl disulfide and thiamine tetrahydropyranyl-2-methyl disulfide (referred to as TTFD, TTPD and TTMD, respectively), which are representable by the afore-mentioned general formula wherein:

TTFD: $R^1=CH_3$, $R^2$=furyl, $R^3=H$, $n=1$
TTPD: $R^1=CH_3$, $R^2$=tetrahydrofuryl, $R^3=H$, $n=3$
TTMD: $R^1=CH_3$, $R^2$=tetrahydropyranyl, $R^3=H$, $n=1$ Control tests were conducted using thiamine propyl disulfied which is the most effective of all known disulfide-type thiamine derivatives and thiamine hydrochloride.

When TTFD, TTPD or TTMD is injected intravenously into ears of rabbits, the thiamine concentration in blood is increased remarkably and the high concentration is maintained for a long time. The tests were conducted with rabbits weighing about 2 kg. each. The amount of each sample injected corresponds to 10 mg. of thiamine hydrochloride, i.e. 11.8 mg. of TTFD, 13.7 mg. of TTPD, 12.3 mg. of TTMD and 10.6 mg. of thiamine propyl disulfide. The thiamine concentration in blood was measured several times after the injection. The results were as follows:

| Sample | Cases | before injection | Thiamine in blood (mean value)[1] | | | | |
|---|---|---|---|---|---|---|---|
| | | | after injection | | | | |
| | | | 3 min. | 10 min. | 30 min. | 60 min. | 90 min. |
| TTFD | Mg. 11.8 | 4 | 34.8 | 2,335 | 2,311 | 2,178 | 1,882 | 1,756 |
| TTPD | 13.7 | 8 | 42.8 | 1,529 | 1,729 | 1,595 | 1,463 | 1,282 |
| TTMD | 12.3 | 8 | 48.0 | 2,372 | 2,471 | 2,227 | 1,924 | 1,818 |
| Thiamine propyl disulfide | 10.6 | 5 | 63.4 | 1,648 | 1,564 | 1,459 | 1,338 | 1,229 |
| Thiamine hydrochloride | 10.0 | 1 | 46.7 | 718 | 516 | 282 | 156 | 140 |

[1] "Thiamine in blood" is concentration ($\gamma\%$) of total thiamine in 1 ml. of total blood.

In the above tests the quantitative determination of the thiamine in blood was conducted by a chemical method, i.e. the thiamine in blood was reduced with cystein and then determined by the thiochrome method using bromocyanide.

From the results of the above tests, it is obvious that when the compounds of this invention are injected into living bodies, the concentration of the total thiamine in blood becomes far higher than that in the case of thiamine hydrochloride or thiamine propyl disulfide, and duration of the high concentration is also far longer than in the case of the above two compounds.

TTFD was administered per os or by intraperitioneal injection to rats, and its lethal dose was observed. As a result, it was found that $LD_{50}$ value (mg./kg.) was very low as shown below:

| Administration conditions | TTFD | Thiamine hydrochlorid |
|---|---|---|
| orally | 2,200 | 9,000 |
| intraperitoneal injection | 540 | 500 |

And the toxicities of the other products of this invention are also relatively low.

Now mention is made of the preparation of the compounds of the present invention. The preparation comprises subjecting thiamine, ethyl thiamine (a compound having the same structure as thiamine except that the methyl group in the pyrimidine nucleus is replaced by an ethyl radical) or their O-acyl derivatives (these compounds will be referred to as "thiamine or its related compounds" hereinafter) to a reaction with an active compound which is able to convert —SH group into $-S-S-(CH_2)_n-R^2$ wherein $R^2$ is a furyl or pyranyl radical and $n$ is a positive integral number.

Thiamine or its related compounds are generally available as acid salts such as hydrochloride, nitrate and sulfate and these acid salts are all usable in the present invention. As the active compound for introducing $-S-S-(CH_2)_n-R^2$ group into the starting material there may be counted compounds having the general formulae:

$$R^2—(CH_2)_n—S—SO_3M$$
$$R^2—(CH_2)_n—\overset{O}{\overset{\frown}{S}}—S—R$$
$$R^2—(CH_2)_n—\overset{O_2}{\overset{\frown}{S}}—S—R$$
$$R^2—(CH_2)_n—S—S—CN$$
$$R^2—(CH_2)_n—S—X$$
$$R^2—(CH_2)_n—SH$$

wherein $R^2$ and $n$ have the afore-mentioned significances, M is an alkali or alkali earth metal, R is an alkyl radical or a group similar to $R^2$, and X is halogen.

In the present invention, one of the above compounds is reacted with a thiol type thiamine or its related compounds.

It is generally known that thiamine or its related compounds exist in solution in the state of equilibrium between the ammonium-type and the thiol-type, and that the equilibrium shifts to the thiol-type under an alkaline condition and to the ammonium-type under an acid condition, as shown below:

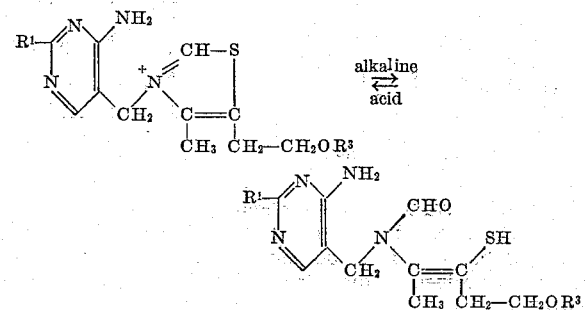

Accordingly, the reaction of the present invention takes place under neutral or an alkaline condition, in other words, the reaction proceeds smoothly at a non-acidic pH. The yield of the product may be lowered when the reaction is conducted in a medium which is too strongly alkaline, because not only thiamine or its related compounds but also the products may be decomposed under such conditions. The most preferable pH lies between 7 and 9.

The reaction is carried out in a solvent such as water, alcohols, acetone, acetic esters or their mixtures, but other solvents may be used if they are inert to the reaction system. Although most of the above exemplified reagents for introducing —S—$(CH_2)_n$—$R^2$ group are used without the aid of any other reagent, the $R^2$—$(CH_2)_n$—SH type reagent alone is employed together with an oxidizing agent such as bromine, hydrogen peroxide, potassium permanganate and alkali bichromates. Electrolytic oxidation may also be applied for the purpose.

Instead of the above-mentioned processes, other methods may be used for converting —SH group of thiol-type thiamine or its related compounds into $$—S—S—(CH_2)_n—R^2$$

group, but they are all included in the scope of the present invention.

When the starting material is an O-acyl derivative of thiamine or of ethyl thiamine, the product is also the corresponding O-acyl derivative, but the acyl group can be readily split off by the conventional method. If the material has free hydroxyl radical, the product has also free hydroxyl radical, but the hydroxyl group of the product can be acylated in a usual manner, if necessary.

The products of this invention have all thiamine activities as shown before, therefore they may clinically or veterinarily be usable for preventing or treating thiamine avitaminosis such as beriberi and neuritis. The medicinal dose of these products may be determined by the corresponding dose to thiamine hydrochloride usable in each case.

Following are examples illustrating and explaining the actual working of the process of this invention, but they do not restrict the scope of this invention. In all the examples, "part" is by weight, analytical value is in percent, and all temperatures are uncorrected.

*Example 1*

To a solution of 20 parts of thiamine hydrochloride in 30 parts of water is added an aqueous solution of sodium hydroxide (7.2 parts of NaOH in 30 parts of water), and the mixture is cooled with water. The mixture is allowed to stand for 30 minutes, 60 parts of chloroform is added, followed by a solution of 30 parts of crude sodium tetrahydrofurfurylthiosulfate in 30 parts of water, and the whole is stirred for 30 minutes. The chloroform layer is separated and the aqueous layer is extracted twice with 20 parts of chloroform. All the chloroform solutions are combined and shaken with 50 parts of 5% hydrochloric acid. The acid solution is decolorized and neutralized with alkali carbonate, whereupon thiamine tetrahydrofurfuryl disulfide separates out in the resinous state but soon solidifies (M.P. 129° C. (decomp.)). The yield is 16 parts. Recrystallization from ethyl acetate gives colorless prisms melting at 132° C. (decomp.).

*Analysis.*—Calcd. for $C_{17}H_{26}O_3N_4S_2$: C, 51.22; H, 6.58. Found: C, 51.11; H, 6.45.

*Example 2*

To 100 parts of 50% ethanol are added 3 parts of tetrahydrofurfuryl tetrahydrofurfurylthiosulfinate and 2 parts of thiamine hydrochloride and the mixture is adjusted to pH 8 with 10% aqueous solution of sodium hydroxide. While maintaining the pH, the mixture is warmed for one hour at a temperature between 50–60° C., when the thiochrome reaction of the mixture becomes negative. After decolorizing, the mixture is concentrated to dryness under reduced pressure and a small quantity of water is added to the residue to dissolve inorganic impurities, when an oily substance remains, which, however, solidifies when scrubbed (M.P. 129° C. (decomp.)). The yield is 1.2 parts. Recrystallization from ethyl acetate gives colorless prisms, M.P. 132° C. (decomp.). No depression of melting point is observed when the product is melted with the product of Example 1.

*Example 3*

To a solution of 3.4 parts of thiamine hydrochloride in 5 parts of water is added a solution of 1.2 parts of sodium hydroxide in 5 parts of water and the mixture is left standing for 30 minutes. To the mixture is added 12 parts of chloroform, followed by a solution of 4.7 parts of sodium tetrahydrofuryl-2-propyl thiosulfate in 5 parts of water with stirring. Thirty minutes later, the chloroform layer is separated and the aqueous layer is extracted with 12 parts of chloroform. All the chloroform solutions are combined and shaken with 25 parts of 5% hydrochloric acid, and the acid solution, after being decolorized, is neutralized with alkali carbonate, when thiamine tetrahydrofuryl-2-propyl disulfide separates out in the resinous state. The yield is 3 parts.

*Example 4*

To a solution of 3.4 parts of thiamine hydrochloride in 5 parts of water is added a solution of 1.2 parts of sodium hydroxide in 5 parts of water. The mixture is allowed to stand for 30 minutes and 12 parts of chloroform is added, followed by 6 parts of crude sodium tetrahydropyran-2-methyl thiosulfate with stirring. After 30 minutes, the chloroform layer is separated and the aqueous layer is extracted with 12 parts of chloroform. All the chloroform solutions are combined and shaken with 15 parts of 5% hydrochloric acid. The acid solution is decolorized and neutralized with alkali carbonate, whereupon thiamine tetrahydropyran-2-methyl disulfide separates out as a resinous substance, which, however, crystallizes soon in colorless prisms, M.P. 126–127° C. (decomp.). The yield is 1.4 parts. Recrystallization from benzene gives large colorless leaves.

What is claimed is:
1. A crystallizable compound having the formula

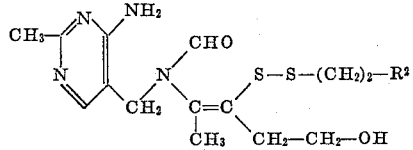

wherein $R^2$ is a member selected from the group consisting of tetrahydrofuryl and tetrahydropyranyl groups, said compound, notwithstanding the presence therein of a mercaptan grouping, being free of any characteristic mercaptan odor.

2. A crystallizable compound having the formula

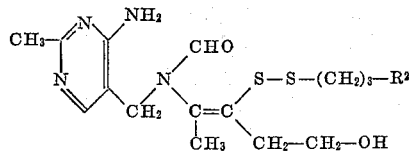

wherein $R^2$ is a member selected from the group consisting of tetrahydrofuryl and tetrahydropyranyl groups, said compound, notwithstanding the presence therein of a mercaptan grouping, being free of any characteristic mercaptan odor.

3. A crystallizable compound having the formula

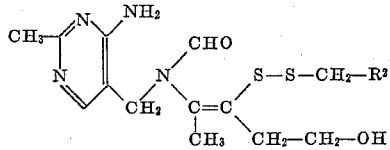

wherein $R^2$ is a member selected from the group consisting of tetrahydrofuryl and tetrahydropyranyl groups, said compound, notwithstanding the presence therein of a mercaptan grouping, being free of any characteristic mercaptan odor.

4. A crystallizable compound having the formula

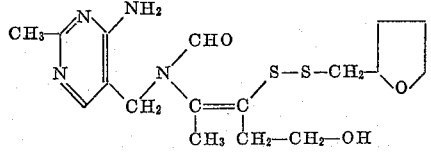

said compound, notwithstanding the presence therein of a mercaptan grouping, being free of any characteristic mercaptan odor.

5. A crystallizable compound having the formula

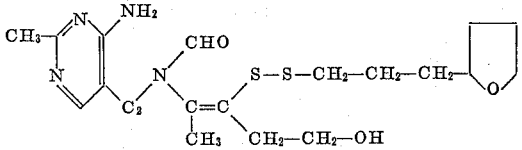

said compound, notwithstanding the presence therein of a mercaptan grouping, being free of any characteristic mercaptan odor.

6. A crystallizable compound having the formula

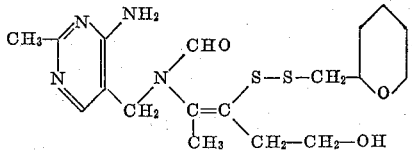

said compound, notwithstanding the presence therein of a mercaptan grouping, being free of any characteristic mercaptan odor.

References Cited in the file of this patent
UNITED STATES PATENTS

| | | |
|---|---|---|
| 2,024,567 | Clifford | Dec. 17, 1935 |
| 2,026,863 | Bogemann | Jan. 7, 1936 |

OTHER REFERENCES

Hackh's Chemical Dictionary, page 18, 3rd ed. (1944).
Richter's Organic Chemistry, vol. IV, page 4 (1947).
Elderfield: "Heterocyclic Compounds," vol. 5, pages 646–9 (1957).
Yurugi: Jour. Pharm. Soc. (Japan), vol. 77, pages 15–16.

UNITED STATES PATENT OFFICE
CERTIFICATE OF CORRECTION

Patent No. 3,016,380                              January 9, 1962

Shojiro Yurugi et al.

It is hereby certified that error appears in the above numbered patent requiring correction and that the said Letters Patent should read as corrected below.

Column 1, line 53, for "disulfied" read -- disulfide --; column 2, line 34, for "intraperitioneal" read -- intraperitoneal --; column 6, lines 13 to 19, the left-hand portion of the formula should appear as shown below instead of as in the patent:

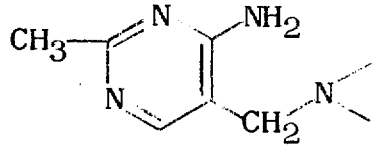

Signed and sealed this 14th day of August 1962.

(SEAL)
Attest:
ERNEST W. SWIDER
Attesting Officer

DAVID L. LADD
Commissioner of Patents